United States Patent [19]

Hirschvogel

[11] Patent Number: 5,509,993
[45] Date of Patent: Apr. 23, 1996

[54] PROCESS FOR THE PREPARATION OF A METAL AND GRAPHITE LAMINATE

[75] Inventor: Alfred Hirschvogel, Achsheim, Germany

[73] Assignee: Sigri Great Lakes Carbon GmbH, Wiesbaden, Germany

[21] Appl. No.: 217,598

[22] Filed: Mar. 24, 1994

[30] Foreign Application Priority Data

Mar. 25, 1993 [DE] Germany .......................... 43 09 700.6

[51] Int. Cl.⁶ ........................................ C09J 1/00
[52] U.S. Cl. .................. 156/326; 156/314; 156/325; 428/408
[58] Field of Search ..................... 156/326, 314, 156/325; 428/408

[56] References Cited

U.S. PATENT DOCUMENTS

| | | | |
|---|---|---|---|
| 3,404,061 | 10/1968 | Shawe et al. | 428/408 |
| 3,492,197 | 1/1970 | Olstowski et al. | 156/326 |
| 4,091,083 | 5/1978 | Hirschvogel . | |
| 4,422,894 | 12/1983 | Atkinson et al. . | |

FOREIGN PATENT DOCUMENTS

| | | |
|---|---|---|
| 2518351 | 11/1976 | Germany . |
| 2608866 | 1/1980 | Germany . |
| 3719484 | 12/1988 | Germany . |
| 3244595 | 3/1989 | Germany . |
| 2131500 | 6/1984 | United Kingdom . |

OTHER PUBLICATIONS

"Silicon–Textilhilfsmittel", Hardt, Textilveredelung 19, 1984 Nr. 5, pp. 143–146.
"Ullmanns Encyklopaedie der technischen Chemie", 1966, Foerst, pp. 203–206.
"Sigraflex–Products Manufacrued From Flexible Graphite Foil", Sigri, pp. 1–28.

Primary Examiner—John J. Gallagher
Attorney, Agent, or Firm—Herbert L. Lerner; Laurence A. Greenberg

[57] ABSTRACT

A process for the preparation of a laminate of at least one metal layer and at least one layer of flexible graphite includes producing a non-detachable bond between the graphite and the metal without using a mechanical anchoring device and without using a known adhesive. Initially, a contact surface-active agent from the group including organosilicon compounds, perfluorinated compounds and metal soaps is applied in a thin layer to at least one of the surfaces to be bonded. Then the surfaces to be bonded are brought into contact and bonded together by the action of pressure and heat.

42 Claims, No Drawings

PROCESS FOR THE PREPARATION OF A METAL AND GRAPHITE LAMINATE

BACKGROUND OF THE INVENTION

1. Field of the Invention

The invention relates to a process for the preparation of a laminate from at least one layer of a metal and at least one layer of graphite, wherein a non-detachable bond is provided over a whole surface between the metal and the graphite and the graphite which is used is prepared by pressing expanded graphite.

Laminates of metal plates or sheets and of graphite sheets or foils that are manufactured by compression of vermicular or expanded graphite are known (from U.S. Pat. No. 3,404,061; German Published, Non-Prosecuted Application DE-OS 25 18 351; U.S. Pat. No. 4,422,894; and company literature entitled SIGRAFLEX from the firm Sigri Great Lakes Carbon GmbH of Wiesbaden, Federal Republic of Germany). They are used mainly for flat gaskets, parts built into ovens, radiation shields, filter plates in electrostatic filters and corrosion-resistant linings.

The primary reason for the development of such laminates was the comparatively low resistance to tensile or bending loads shown by graphite sheets or foils manufactured by pressing expanded graphite. During handling in rough routine operations such low resistance often resulted in damage to the non-reinforced graphite elements, restricting the use of products of that type which otherwise had outstanding thermal, electrical and chemical properties.

The configuration and order of the individual layers in such laminates can be freely selected to a large extent and is dependent on the intended application. In most cases, the graphite is applied to one or both sides of the metal layer.

Two kinds of such laminates can be distinguished according to the nature of the bond between the layers of metal and graphite. In the first case, the bond is mechanical. The metallic part has surface structures which, when pressing the graphite with the metal part, either penetrate the graphite or into which the graphite penetrates by flow processes.

Examples thereof are tanged steel sheets, sheets with untrimmed holes, wire cloth, sintered metals or metal surfaces with porous, rough or damaged surfaces such as, for example, the surfaces of sealing flanges. A frequently undesirable bonding of that kind of flat seals with the opposing surfaces between which the seal is fixed is described, for example, in German Patent DE 32 44 595 C2 (column 2, lines 14 to 28), corresponding to UK Patent GB 2 131 500 B; and in German Published, Non-Prosecuted Application DE 37 19 484 A1 (column 1, line 68 to column 2, lines 1 to 8). Bonds of that type, which are not reproducible and do not appear uniformly distributed over the surfaces that are in contact, are observed only after long use of surfaces which are stretched together under sealing conditions and cannot therefore be used as a basis for the preparation of laminates from layers of metal and graphite of the kind described above.

In the second case, the metal and graphite surfaces are bonded together with a force-locking connection by adhesion using organic or inorganic bonding agents. A force-locking connection is one which connects two elements together by force external to the elements, as opposed to a form-locking connection which is provided by the shapes of the elements themselves. That method is used preferably in the presence of very smooth metal surfaces and/or if the surfaces cannot be provided with mechanical anchoring elements.

All bonds of the first and second types have disadvantages which restrict the use of or cause damage to the laminates.

In order to form a mechanically effective bond, relatively high surface pressures are required during the production of the laminate. Consequently, seals made from such material cannot be used for sealing tasks where only low tension forces are likely to be applied to the contact surfaces. In addition, the engagement or introduction of teeth or elevations of the metal reinforcement into the graphite or the sliding of graphite material into depressions in the metal reinforcement or into depressions in the opposing surfaces of a seal give rise in places to inhomogeneities and weaknesses in the graphite layer.

In seals, that results in inhomogeneities in the distribution of the surface pressure and consequently to the sealing action, in applications as coatings against aggressive media it leads to a reduction in the effective layer thickness and in high temperature applications it leads to uneven heating up or heat dissipation and consequently to distortions and warping resulting in separation in places. Separations are often unavoidable in that type Of bonding, in particular in the manipulation of laminate parts. That is particularly the case with thin and therefore bendable laminates or with small sections of such laminates. Such occurrences frequently lead to a part becoming useless or to the incidence of breakdowns during operation.

In seals with tanged steel reinforcement sheets, cracking of the metallic reinforcing sheets can moreover occur under load. Such damage is caused by points of tension which arise in the corners of the holes that have been formed by the teeth bending out from the sheets. There is also a requirement for the production of composite layers of metal and graphite free of bonding agents which do not have the disadvantages of reinforcements with tanged steel sheets.

The use of bonding agents to produce the bond between the layer or layers of metal and graphite has other disadvantages. Bonding agents of the kind known heretofore for the manufacture of typical laminates are applied in layer thicknesses of at least several μm. This means that between the metal layer and the graphite layer there is an adhesive layer, the composition of which produces certain effects which must be considered, besides the adhesion. Such laminates can be used only at temperatures up to the decomposition temperature of the adhesive. Otherwise the consequence is defects, such as detaching of the graphite layer or blistering on the graphite layer, which prevent or reduce serviceability. Moreover, the penetration of the decomposition products from the bonding agent into apparatus or into the environment is often not tolerable. Even when the laminate section is clamped and consequently there is no fear of separation of the surfaces, as is the case with flat seals, the decomposition of the bonding agent, because of the decrease in volume associated with it, leads to a reduction of the sealing action through lowering of the prestressing due to the screws. Another damage mechanism arises in flat seals if adhesive layers soften through thermal or chemical action. The graphite layers, which are under compressive strain, then begin to slide laterally at relatively low surface pressures, which leads to tearing of the seal in extreme cases. However, in any case the sealing action is reduced because of the decrease in the prestressing due to the screws associated with the sliding process. Re-tightening the screws in that case cannot compensate for that defect, because the sliding processes continue. Finally, costly conductive adhesives must be used in applications such as filter plates in electric filters, for example, where good electrical conductivity is required perpendicularly to the surface of the laminate. Separations in the adhesive system, which can be caused by chemical reactions or by oscillations, in that case lead at least to a drastic reduction in efficiency.

SUMMARY OF THE INVENTION

It is accordingly an object of the invention to provide a process for the preparation of a metal and graphite laminate, which overcomes the hereinafore-mentioned disadvantages of the heretofore-known methods of this general type and which develops a process for the preparation of a laminate from at least one layer of a metal and at least one layer of graphite produced by pressing expanded graphite, in which a temperature-resistant, non-detachable bond effective over the whole area of metal and graphite surfaces to be bonded together is produced without the use of mechanical anchoring techniques or of known bonding agents. In particular, the process should permit the production of a typical laminate which does not have the disadvantages described above for laminates of the prior art and in which the bonding between the metal layer or layers and the graphite layer or layers is not detachable either under thermal stress or under mechanical stresses such as bending or compressive strain, i.e. that the strength of the metal-graphite bond covering the surface over the extent of the entire laminate is greater than the inherent strength of the graphite.

With the foregoing and other objects in view there is provided, in accordance with the invention, in a process for the preparation of a laminate being formed of at least one layer of a metal having a surface and at least one layer of graphite having a surface and being produced by pressing expanded graphite, which includes forming a non-detachable bond over all of the surfaces between the metal and the graphite, the improvement which comprises wetting at least one of the surfaces to be bonded with at least one contact surface-active substance selected from the group consisting of organosilicon compounds, perfluorinated compounds and metal soaps; and bringing the surfaces to be bonded together into contact with each other and bonding the surfaces together at a temperature of minimally 30° C. and maximally 400° C. and a pressure of minimally 1 MPa and maximally 200 MPa.

With the objects of the invention in view, there is also provided, in a process for the preparation of a laminate being formed of at least one layer of a metal having a surface and at least one layer of graphite having a surface and being produced by pressing expanded graphite, which includes forming a non-detachable bond over all of the surfaces between the metal and the graphite, the improvement which comprises wetting at least one of the surfaces to be bonded with at least one contact surface-active substance selected from the group consisting of organosilicon compounds, perfluorinated compounds and soaps of the metals sodium, potassium, magnesium and calcium; incorporating at least one hydrolyzable salt of a metal selected from the group consisting of aluminum, zirconium, titanium, tin, zinc and chromium in molecular form into the at least one contact surface-active substance; and bringing the surfaces to be bonded together into contact with each other and bonding the surfaces together at a temperature of at least 30° C. and at most 400° C. and a pressure of at least 1 MPa and at most 200 MPa.

The graphite used for bonding with the metal is produced in a method which is known per se by thermal expansion of graphite interstitial compounds to so-called expanded graphite and subsequent compression of the expanded graphite without the addition of binders to flexible foils or plates (as in U.S. Patent No. 3 404 061; and German patent DE 26 08 866, corresponding to U.S. Patent No. 4 091 083).

For reasons of simplicity, the term "graphite" is used below to describe this product.

In order to accomplish the object of the present invention, substances for effecting bonding between metal and "graphite" were sought which can be applied evenly and extremely thinly to the surfaces of both materials. Water-repellent and oil-repellent substances can be applied in a known manner in very thin layers to surfaces, especially to textile surfaces and, as the tests showed, also to metals and to "graphite". Surprisingly, it was then found that these substances also function as excellent bonding agents between metal surfaces and "graphite" if the surfaces to be bonded are pressed together at an elevated temperature for a certain period of time. This bonding action is still exhibited even when these substances are applied in such small quantities that at least one of the surfaces to be bonded can only just be covered therewith.

It is essential to the invention that the respective bonding substance be applied in the smallest possible quantity, i.e. in thicknesses in the nm-range. The substances used according to the present invention evidently work selectively as bonding agents on the combination of materials metal and "graphite". Substances other than "graphite" such as metals, rubbers, plastics and wood cannot be firmly bonded by them to a metal substrate. In this case, therefore, the bonding does not follow the bonding mechanisms known in conventional adhesives. This also follows from the fact that in several of the laminates prepared, the strength of the bond between metal and "graphite" continues to exist even above the decomposition temperature of the bonding agent. Disadvantages of the kind described above are no longer apparent. Delaminations of the "graphite" layer are not observed upon bending the laminate. The material can be subjected to pressure up to the inherent strength of the "graphite". Sliding movements of the "graphite" on the metallic substrate no longer occur.

The bonding agents which can be used according to the present invention are contact surface-active substances from the group including organosilicon compounds, preferably silicones, perfluorinated compounds and metal soaps, which are well-known per se and which are used industrially as water repellents, defoaming agents or softening agents, for example, in finishing textiles (according to Silicon— Textilhilfsmittel, in the publication Textilveredelung 19 (1984), pp. 143 to 146 by P. Hardt; Ullmanns Encyklopädie der technischen Chemie [Ullmanns Encyclopedia of Technical Chemistry], 3rd edition (1966), Vol. 17, pp. 203 to 206).

In accordance with another mode of the invention, there is provided a method in which, of the silicones, polysiloxanes from the group dimethylpolysiloxane, methylhydrogenpolysiloxane, (methylpolyalkylene oxide)dimethylpolysiloxane, aminomodified methylpolysiloxane, α,ω-dihydroxydimethylpolysiloxane, α,ω-divinyldimethylpolysiloxane and α,ω-dihydroxy-(methylalkylamino)-dimethylpolysiloxane, are used.

In accordance with a further mode of the invention, there is provided a method in which out of the group of surface-active perfluorinated compounds, perfluorocarboxylic acids and perfluorinated compounds of the general formula $F_3C-(CF_2)_n-R$, where R=polyurethane, polyacrylate, or polymethacrylate and n=6–12 are suitable. None of the bonding substances should have an adhesive character, since otherwise the mode of action of the present invention would no longer be ensured and the disadvantages described above would again become operative.

In accordance with an added mode of the invention, there is provided a method in which the action of the above-mentioned surface-active substances is improved by incorporating in them, either before their application to the surfaces of the metal and/or of the "graphite" or after this process, at least one hydrolyzable salt in molecular form from the group including the metals aluminum, zirconium, titanium, tin, zinc and chromium. This is done either by mixing together the appropriate components in the desired proportion before application or, following the application of the first component being formed of a siloxane and/or a perfluorinated compound and/or a metal soap to one or both of the surfaces to be bonded, by a suitable application method to the layer that was already coated.

In order to obtain the fine distribution required, emulsions, dispersions or solutions are frequently used in this case. The applied hydrolyzable salts are then distributed in the first layer by diffusion in molecular form. Fatty acid salts of the above-mentioned metals are preferably added as hydrolyzable salts. They have moreover a cross-linking action on the surface-active compounds and promote the fixing of the latter to the surfaces to which they have been applied. An epoxyamine may also be used to advantage as a cross-linking agent.

In accordance with yet another mode of the invention, there is provided a method in which the contact surface-active substances named above, independently of the class of compounds to which they belong, may be used alone or mixed with one another, with mixtures of more than two of the surface-active substances being in fact possible but on practical grounds uncommon. For example, mixtures of methylhydrogenpolysiloxane and (methylpolyalkylene oxide)-dimethylpolysiloxane, mixtures of methylhydrogenpolysiloxane and $\alpha,\omega$-dihydroxy-dimethylpolysiloxane and mixtures of amino-modified methylpolysiloxane and $\alpha,\omega$-dihydroxydimethylpolysiloxane are advantageous. A mixture of methylhydrogenpolysiloxane and dimethyl-polysiloxane in an approximate weight ratio of 1:1, preferably in the form of an aqueous emulsion, has proved to be particularly advantageous.

In accordance with yet a further mode of the invention, there is provided a method which comprises adding a wetting agent such as, for example, an alkyl sulphonate or a preparation of a fatty alcohol and an ether alcohol to the liquid to be applied, if difficulties arise in applying the contact surface-active substance or a mixture of such substances evenly to the metal surface or the "graphite" surface.

In accordance with yet an added mode of the invention, there is provided a method which comprises forming the metal component of the laminate of iron, steel, high-grade steel, copper, aluminum, zinc, nickel, titanium, or of alloys of copper, aluminum or zinc. The decision as to which of the metals or which of the alloys is used depends on the intended usage of the laminate. The metals and alloys may be in the form of thin foils, sheets, plates or blocks and the metal surfaces may be flat or bent as in tubes or containers. The metal surfaces intended for bonding with the "graphite" must be cleaned before being processed into a laminate. Further surface treatments are not required.

The components of the laminate may be combined in any possible configuration. In accordance with yet an additional mode of the invention, there is provided a method in which the metal part, that is preferably in the form of foils or flat sections in thicknesses of from a tenth of a millimeter to a few centimeters, is coated on one or both sides with "graphite". Composites of an alternating sequence of metal and "graphite" layers may also be prepared. The surfaces delimiting such composites above and below may be formed either preferably of "graphite" or, more rarely, of metal or there may be a metal layer on one side and a "graphite" layer on the other side.

In accordance with yet another mode of the invention, there is provided a method in which the contact surface-active substance is applied to one or both of the surfaces to be bonded. As a general rule only the metallic surface of the combination is wetted, since the quantity of surface-active substance being used can thereby be further reduced. Analogously, however, only the corresponding surface of the "graphite" layer may be wetted.

When applying the surface-active substances to the surfaces to be bonded, the aim must always be to apply as little as possible of these substances as evenly as possible. Therefore, in the usual procedure pure substances are seldom used. As a rule these are used only if they are of sufficiently low viscosity. Normally solutions of emulsions or dispersions are used, with aqueous emulsions being preferred when operating on a relatively large scale. By selecting the appropriate degree of dilution, possibly combined with the addition of small quantities of wetting agents, extremely thin layers of surface-active substances can thus be applied, for example by brushing with rollers, or by spraying, in each case combined with subsequent wiping or another process that is known per se.

In accordance with yet a further mode of the invention, there is provided a method in which in normal applications the layer thickness is no more than 1000 nm. It should not be less than 10 nm. It is preferable to operate with layer thicknesses of from 100 to 500 nm. It is not necessary for coherent films of surface-active substances to be produced. A uniformly distributed thick layer of the finest droplets also fulfills the purpose according to the present invention. However, wiping away of excess liquid after the first application is also recommended in this case.

The nature of the "graphite" layer depends on the intended usage of the laminate. In general, layers with thicknesses of between 0.1 and 10 mm, preferably from 0.2 to 2 mm, are used. The bulk density of the "graphite" layer to be applied is normally within the range of from 0.01 to 1.8 $g/cm^3$, and preferably from 0.5 to 1.2 $g/cm^3$. It is, however, also possible to apply expanded graphite, in a suitable mold surrounding the metal layer, to the metal surface having been previously supplied with adhesion promoters (bulk density approximately 0.002 $g/cm^3$) and then to compress this expanded graphite in this mold to the desired "graphite" layer. Very thin "graphite" layers can be applied in this manner. A further "graphite" layer, for example, in the form of foils or plates, may optionally be pressed onto a "graphite" layer produced in this manner. This further "graphite" layer then bonds finally with the underlying layer if the latter has not been previously compressed too much.

The "graphite" layers applied to the metal layers prior to pressing may already be of the density intended for them in the finished laminate. The pressure used when pressing together the layers of metal and "graphite" to produce the laminate should not exceed the pressure required to attain the given bulk density of the "graphite" layer. To begin with, graphite layers with a bulk density lower than the final bulk density in the finished pressed laminate may even be applied. The intended final bulk density is then produced only when the components of the laminate are pressed together.

Following the assembly of the components forming the laminate, the desired non-detachable bonding of the layer or layers of metal and "graphite" is produced by pressing them together. Pressing can take place with the aid of any of the known pressing devices which are suitable for the purpose. Die presses or multi-platen presses, which should be capable of being heated, are preferably used.

The process parameters of pressure, temperature and time operate together in the formation of the non-detachable bond. In accordance with again a concomitant mode of the invention, there is provided a method in which the desired bond strength is attained, for example, when pressing together takes place at comparatively low temperatures of from approximately 30° to 50° C. over a very long period, i.e. on the order of days, under the action of comparatively high pressures. However, the pressing time that is required can be greatly reduced by raising the pressing temperature. High pressures likewise effect a reduction in the pressing time. In order to ensure economical operation, pressures of from 1 to 50 MPa, and preferably of from 3 to 10 MPa, are applied at temperatures of from 80° to 300° C., and preferably of from 120° to 200° C. When operating within the last-mentioned parameter range, to bring the parameters to the appropriate optimum state, which one of skill will easily do with the aid of the data obtained by appropriate tests, pressing times of between 5 minutes and 5 hours, and preferably of from one to two hours, are required.

The laminates obtained after releasing the pressure and cooling to room temperature have a non-detachable bond between the respective metal layer and the "graphite" layer allocated to it. In attempts to detach the "graphite" layer from the metal layer, for example by bending or by applying the-peeling test or a tearing test, cracking always appears within the graphite layer and not in the metal—"graphite" bonding zone, i.e., the strength of the bonding between the layers of the laminate produced according to the present invention is greater than the internal strength of the "graphite" layer.

Laminates according to the present invention are stable to handling, excepting mechanical damage to the comparatively soft graphite surfaces. No separations appear upon bending even in very thin laminates of this type. The outer "graphite" layer of the laminate can be surface-treated, for example, by electroplating with metals, by heat processes or impregnations with furan resin according to German Patent DE 32 44 595 C2, corresponding to UK Patent GB 2 131 500 B, without the bonding strength of the laminate layers being adversely affected. The strength of the bond remains even under the action of all chemical substances which do not corrode the metallic part of the laminate. When used as flat seals, laminates according to the present invention are more compression-proof and heat-resistant than conventional bonded metal—"graphite" seals. They are moreover resistant to delaminations of the "graphite" part.

Other features which are considered as characteristic for the invention are set forth in the appended claims.

Although the invention is illustrated and described herein as embodied in a process for the preparation of a metal and graphite laminate, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying illustrative examples.

EXAMPLE 1

A steel sheet, of Material No. 1.4401, with the dimensions 100×100×0.05 mm, was cleaned by wiping with a cloth and then coated with a surface-active preparation of the following composition: aqueous emulsion of methylhydrogenpolysiloxane and dimethylpolysiloxane (solids content approximately 25% by weight) mixed with a contact surface-active preparation of ethoxylated fatty alcohol and araliphatic ether alcohol in the proportion by volume of 1:1. The siloxane emulsion used is obtainable under the product designation BC (new) from the firm Pfersee Chemie, D-86462 Langweid/Lech, Federal Republic of Germany. The fatty alcohol/ether alcohol preparation is obtainable under the product designation Invadin PBN from the same firm. A felt surface applicator soaked in the surface-active preparation was used for coating. After the first application process by brushing the metal surface, the coated sheet was pre-dried for 1.5 to 2 minutes at 60° C. Then the coating was applied again with a second surface applicator not containing any emulsion, with the surface thickness being reduced and the layer being made entirely even. After further drying, during which the surface temperature on the coated side of the sheet did not exceed 150° C., the coated side of the sheet was covered with a "graphite" film with a thickness of 0.25 mm and a bulk density of 1.0 g/cm$^3$. Afterwards the coated and covered sheet was transferred to a heatable stamping machine and pressed at a temperature of 200° C. under an applied pressure of 7 MPa for 1 hour. The laminate thus obtained was flexible. The laminated "graphite" film could not be detached from the metallic substrate without being destroyed (bending-peeling test). This excellent bonding survived even after treatment of the laminate with organic solvents such as ethyl alcohol, benzene, trichloroethylene, hot toluene or tetrahydrofuran. The adhesive properties were unchanged even after heating the laminate to 400° C.

EXAMPLE 2

A nickel sheet, with the dimensions 100×100×0.05 mm, was coated with the following aqueous emulsion in the same manner as described in Example 1: a mixture of Si-Finish WS60E emulsion from the firm Wacker Chemie, Munich, Federal Republic of Germany, having a solids content of 30% by weight, with the effective contact surface-active substances dimethylpolysiloxane and methylhydrogenpolysiloxane and an epoxyamine cross-linking agent from the firm Wacker Chemie, Munich, Federal Republic of Germany, designation V 32. The quantity added, by reference to the polysiloxane emulsion, was 15 g/l. The coated nickel sheet was covered, as described in Example 1, with a 0.25 mm thick graphite film with a bulk density of 1.1 g/cm$^3$ and the combination of layers thus obtained was pressed in a heatable die press at 210° C. under a pressure of 15 MPa for 4 hours. The adhesive properties of the film on the nickel sheet and the behavior under stress of the laminate corresponded to that of the laminate described in Example 1.

EXAMPLE 3

A sheet of ferritic steel with the dimensions 500×500×1 mm, was immersed in an aqueous emulsion of perfluorinated hydrocarbons, with a solids content of 30% by weight, having the product designation SCOTCHGARD FC 270, supplied by the firm 3M, after cleaning of the surfaces. After immersion, the plate was guided through a liquid wiper active on both sides which was fitted with felt lips and then 3 times through a pushed-batt furnace, the atmosphere of which was set at a temperature of 90° C. The applied layer was equalized on both sides with felt wipers and was further reduced following each passage through the furnace. After the third passage a largely dry layer was present. A "graphite" laminate with a thickness of 1 mm and a bulk density of 1.1 g/cm³ was laid evenly on both sides of the metal sheet that was prepared in this way and the configuration of layers thus obtained was pressed in a heatable die press at 180° C. for 3 hours under a pressure of 5 MPa. In accordance with German Patent DE 32 44 595 C2, corresponding to UK Patent GB 2 131 500 B, the laminate which was then obtained was impregnated with a furan resin that penetrated only into the surface zones of the "graphite" layers. For that the laminate was exposed to a solution of furfuryl alcohol and maleic anhydride and after the impregnation process was exposed to a hardening temperature of 200° C. The flat seals prepared from the surface-impregnated laminate obtained in this manner did not exhibit any delaminations between the "graphite" layers and the metal core in tearing tests. The destruction occurred every time within the "graphite" layers. Under test conditions with high initial screw stresses, no flow of parts of the "graphite" layers onto the metallic substrate was detected in the seals up to the load limit of the "graphite" laminate. After release, the seal could be detached easily from the flanges.

EXAMPLE 4

Three aluminum sheets with the dimensions 500×500× 0.05 mm were coated on both sides, as described in Example 3, with an aqueous emulsion of an α,ω-dihydroxy(methylalkylamino)— dimethylpolysiloxane containing 30% by weight of solids, from the supplier Wacker Chemie, Munich, Federal Republic of Germany, with the product designation VP 1445. After drying the surface-active coating on the surfaces of the sheets, a stacked pile of alternating layers of "graphite" film and aluminum sheet was prepared from three of the aluminum sheets and four "graphite" films with a thickness of 0.25 mm, a bulk density of 1.0 g/cm³ and a surface area of 500×500 mm and this stacked pile was pressed in a heatable die press at a temperature of 210° C., a pressure of 10 MPa and a pressing time of 1 hour. The laminated composite that was obtained was rigid. Sealing bodies could be produced from it by conventional processing methods such as pressing or cutting, without delaminations of the aluminum and/or of the "graphite" layers. Tearing tests again showed that the aluminum/"graphite" bond was stronger than the internal strength of the "graphite" layers.

EXAMPLE 5

A galvanized iron sheet with the dimensions 500×500×0.2 mm was coated, as was described in Example 3, with an aqueous emulsion of an α,ω-dihydroxydimethylpolysiloxane containing 40% by weight of solid, with the product designation CT 92E, from the supplier Wacker Chemic, Munich, Federal Republic of Germany, and the applied layer was reduced to a minimum and equalized by wiping and drying. The sheet which was thus prepared was then placed in a box-shaped pressing mold and coated there with a layer of expanded graphite being approximately 10 cm in height. The expanded graphite was then compressed to a thickness of approximately 1 mm under a pressure of 1.0 MPa at a temperature of 150° C. and the pressure was maintained for 30 minutes in order to obtain a non-detachable bond between the precompressed "graphite" and the zinc. Then a second "graphite" layer with a bulk density of 0.5 g/cm³ and a thickness of approximately 3 mm was laid onto the thus precompressed "graphite" layer. Subsequently, while maintaining the temperature at 150° C., final pressing was carried out at a pressure of 6 MPa for a period of 5 minutes. A strong material-locking bond between the "graphite" layers was thereby formed and a graphite layer with a thickness of 1.7 mm and a bulk density of 1.0 g/cm³ was created which could not be detached from the zinc layer without being destroyed.

EXAMPLE 6

Following the same procedure as was described in Example 3, a copper sheet with the dimensions 500×500× 0.1 mm was coated with a perfluorinated hydrocarbon using an aqueous emulsion with 30% by weight of solids, having the product designation Oleophobol C+S, supplied by the chemical factory Pfersee, D-86462, Langweid/Lech, Federal Republic of Germany. A "graphite" layer with a bulk density of 1.1 g/cm³ and a thickness of 2 mm was placed on one side of the coated copper sheet and the configuration was pressed with a pressure of 7.5 MPa for 1 hour at a temperature of 190° C. With this laminate too, the "graphite" layer could not be removed without being destroyed.

EXAMPLE 7

An iron sheet with the dimensions 100×100×0.05 mm was immersed in a solution of 100 g of potassium stearate and 150 g of chromium (III) acetate in 5 l of water and the adhering solution remaining after draining off the bulk of the solution was spread over the surface with a felt cloth moistened with the solution. The treated sheet was pre-dried in a drying cupboard at 50° C. for 2 minutes and then wiped with an unmoistened felt cloth and covered with a "graphite" film with a thickness of 0.5 mm and a bulk density of 1.1 g/cm³. Then the superimposed layers were pressed together in a die press at a pressure of 20 MPa for 6 hours at a temperature of 190° C. After removal from the press the "graphite" film could not be separated from the surface of the sheet either by peeling or by tearing without being destroyed.

Determination of the layer thickness of the contact surface-active substance:

The layer thickness of the contact surface-active substances on the metallic substrates used in Examples 1 to 7 was determined by weighing corresponding similarly treated test sheets or plates with an area of 100×100 mm which had been dried at 110° C., first in the uncoated state and then coated, determining the quantity of the contact surface-active substance per cm² of coated surface and converting this value to the layer thickness from the density of the contact surface-active substance. Layer thicknesses of between 200 and 500 nm were established for the examples described.

I claim:

1. In a process for the preparation of a laminate being formed of at least one layer of a metal having a surface and at least one layer of graphite having a surface and being produced by pressing expanded graphite, which includes forming a non-detachable bond over all of the surfaces between the metal and the graphite, the improvement which comprises:

wetting at least one of the surfaces to be bonded with at least one contact surface-active substance having no adhesive character and being selected from the group consisting of organosilicon compounds, perfluorinated compounds and metal soaps, and providing the surface-active substance in a thickness not less than 10 nm and not more than 1000 nm; and bringing the surfaces to be bonded together into contact with each other and bonding the surfaces together at a temperature of minimally 30° C. and maximally 400° C. and a pressure of minimally 1 MPa and maximally 200 MPa.

2. The process according to claim 1, which comprises selecting the metal layer from the group consisting of iron, steel, high-grade steel, copper, nickel, titanium, aluminum, zinc and of alloys of copper, aluminum and zinc.

3. The process according to claim 2, which comprises applying a graphite layer to one surface of the metal layer in the form of a plate.

4. The process according to claim 2, which comprises applying a graphite layer to two flat sides of the metal layer in the form of a plate.

5. The process according to claim 2, which comprises preparing the laminate from more than two alternating layers of metal and graphite.

6. The process according to claim 1, which comprises selecting a polysiloxane as the contact surface-active substance.

7. The process according to claim 1, which comprises selecting a polysiloxane from the group consisting of dimethylpolysiloxane, methylhydrogenpolysiloxane, (methylpolyalkylene oxide)dimethylpolysiloxane, amino- modified methylpolysiloxane, $\alpha,\omega$-dihydroxydimethyl-polysiloxane, $\alpha,\omega$-divinyl-dimethylpolysiloxane and $\alpha,\omega$-dihydroxy-(methylalkylamino)-dimethylpolysiloxane, as the contact surface-active agent.

8. The process according to claim 1, which comprises selecting a compound from the group consisting of perfluorinated hydrocarbons of the general formula $CF_3$—$(CF_2)_n$—R, wherein R is a polyurethane, a polyacrylate or polymethacrylate ligand and n is a number between 6 and 12, as the contact surface-active substance.

9. The process according to claim 1, which comprises selecting mixtures of:

a polysiloxane from the group consisting of dimethylpolysiloxane, methylhydrogenpolysiloxane, (methyl-polyalkylene oxide)dimethylpolysiloxane, amino-modified methylpolysiloxane, $\alpha,\omega$-dihydroxydimethylpolysiloxane, $\alpha,\omega$-divinyldimethylpolysiloxane and $\alpha,\omega$-dihydroxy-(methylalkylamino)dimethylpolysiloxane; and a compound from the group consisting of perfluorinated hydrocarbons of the general formula $CF_3$—$(CF_2)_n$—R, wherein R is a polyurethane, a polyacrylate or polymethacrylate ligand and n is a number between 6 and 12;

as the surface-active substances.

10. The process according to claim 1, which comprises applying the surface-active substance in the form of an aqueous emulsion.

11. The process according to claim 1, which comprises selecting an aqueous emulsion of a methylhydrogenpolysiloxane and a dimethylpolysiloxane as the surface-active agent.

12. The process according to claim 1, which comprises adding cross-linking agents from the group consisting of fatty acid salts of the metals aluminum, zirconium, titanium, tin, zinc, chromium and epoxyamine to the surface-active substances.

13. The process according to claim 1, which comprises applying the surface-active substance in a layer thickness of from 100 to 500 nm.

14. The process according to claim 1, which comprises applying the graphite layer to a surface of the metal layer with the graphite layer having a bulk density of from 0.01 to 1.8 g/cm$^3$.

15. The process according to Claim 1, which comprises coating a surface of the metal layer with the contact surface-active substance and producing the graphite layer by compression of vermicular graphite on the metal layer.

16. The process according to claim 1, which comprises selecting a thickness of the graphite layer of from 0.1 to 10 mm.

17. The process according to claim 1, which comprises applying pressure within a range of from 1 to 50 MPa.

18. The process according to claim 1, which comprises applying pressure within a range of from 3 to 10 MPa.

19. The process according to claim 1, which comprises pressing the layers at a temperature within a range of from 80° to 300° C.

20. The process according to claim 1, which comprises pressing the layers of metal and graphite together for between 5 minutes and 5 hours.

21. The process according to claim 1, which comprises pressing the layers of metal and graphite together for between one hour and two hours.

22. In a process for the preparation of a laminate being formed of at least one layer of a metal having a surface and at least one layer of graphite having a surface and being produced by pressing expanded graphite, which includes forming a non-detachable bond over all of the surfaces between the metal and the graphite, the improvement which comprises:

wetting at least one of the surfaces to be bonded with at least one contact surface-active substance having no adhesive character and being selected from the group consisting of organosilicon compounds, perfluorinated compounds and soaps of the metals sodium, potassium, magnesium and calcium, and providing the surface-active substance in a thickness not less than 10 nm and not more than 1000 nm;

incorporating at least one hydrolyzable salt of a metal selected from the group consisting of aluminium, zirconium, titanium, tin, zinc and chromium in molecular form into the at least one contact surface-active substance; and bringing the surfaces to be bonded together into contact with each other and bonding the surfaces together at a temperature of at least 30° C. and at most 400° C. and a pressure of at least 1 MPa and at most 200 MPa.

23. The process according to claim 22, which comprises selecting the metal layer from the group consisting of iron, steel, high-grade steel, copper, nickel, titanium, aluminium, zinc and of alloys of copper, aluminium and zinc.

24. The process according to claim 23, which comprises applying a graphite layer to one surface of the metal layer in the form of a plate.

25. The process according to claim 23, which comprises applying a graphite layer to two flat sides of the metal layer in the form of a plate.

26. The process according to claim 23, which comprises preparing the laminate from more than two alternating layers of metal and graphite.

27. The process according to claim 22, which comprises selecting a polysiloxane as the contact surface-active substance.

28. The process according to claim 22, which comprises selecting a polysiloxane from the group consisting of dimethylpoly-siloxane, methylhydrogenpolysiloxane, (methylpolyalkylene oxide)dimethylpolysiloxane, amino-modified methylpolysiloxane, $\alpha,\omega$-dihydroxydimethylpolysiloxane, α,ω-divinyl-dimethylpolysiloxane and α,ω-dihydroxy-(methylalkylamino)-dimethylpolysiloxane, as the contact surface-active agent.

29. The process according to claim 22, which comprises selecting a compound from the group consisting of perfluorinated hydrocarbons of the general formula $CF_3$—$(CF_2)_n$—R, wherein R is a polyurethane, a polyacrylate or polymethacrylate ligand and n is a number between 6 and 12, as the contact surface-active substance.

30. The process according to claim 22, which comprises selecting mixtures of:

a polysiloxane from the group consisting of dimethylpolysiloxane, methylhydrogenpolysiloxane, (methyl-polyalkylene oxide)dimethylpolysiloxane, amino-modified methylpolysiloxane, α,ω-dihydroxydimethylpolysiloxane, α,ω-divinyl-dimethylpolysiloxane and α,ω-dihydroxy-(methylalkylamino)dimethylpolysiloxane; and a compound from the group consisting of perfluorinated hydrocarbons of the general formula $CF_3$—$(CF_2)_n$—R, wherein R is a polyurethane, a polyacrylate or polymethacrylate ligand and n is a number between 6 and 12;

as the surface-active substances.

31. The process according to claim 22, which comprises applying the surface-active substance in the form of an aqueous emulsion.

32. The process according to claim 22, which comprises selecting an aqueous emulsion of a methylhydrogenpolysiloxane and a dimethylpolysiloxane as the surface-active agent.

33. The process according to claim 22, which comprises adding cross-linking agents from the group consisting of fatty acid salts of the metals aluminium, zirconium, titanium, tin, zinc, chromium and epoxyamine to the surface-active substances.

34. The process according to claim 22, which comprises applying the surface-active substance in a layer thickness of from 100 to 500 nm.

35. The process according to claim 22, which comprises applying the graphite layer to a surface of the metal layer with the graphite layer having a bulk density of from 0.01 to 1.8 $g/cm^3$.

36. The process according to claim 22, which comprises coating a surface of the metal layer with the contact surface-active substance and producing the graphite layer by compression of vermicular graphite on the metal layer.

37. The process according to claim 22, which comprises selecting a thickness of the graphite layer of from 0.1 to 10 mm.

38. The process according to claim 22, which comprises applying pressure within a range of from 1 to 50 MPa.

39. The process according to claim 22, which comprises applying pressure within a range of from 3 to 10 MPa.

40. The process according to claim 22, which comprises pressing the layers at a temperature within a range of from 80° to 300° C.

41. The process according to claim 22, which comprises pressing the layers of metal and graphite together for between 5 minutes and 5 hours.

42. The process according to claim 22, which comprises pressing the layers of metal and graphite together for between one hour and two hours.

* * * * *